(12) United States Patent
Wentink

(10) Patent No.: US 9,144,056 B2
(45) Date of Patent: Sep. 22, 2015

(54) BROADCAST TEARDOWN APPARATUS AND METHOD

(75) Inventor: Maarten Menzo Wentink, Naarden (NL)

(73) Assignee: Qualcomm Incorporated, San Diego, CA (US)

( * ) Notice: Subject to any disclaimer, the term of this patent is extended or adjusted under 35 U.S.C. 154(b) by 92 days.

(21) Appl. No.: 13/607,272

(22) Filed: Sep. 7, 2012

(65) Prior Publication Data

US 2013/0235782 A1    Sep. 12, 2013

Related U.S. Application Data

(60) Provisional application No. 61/533,146, filed on Sep. 9, 2011.

(51) Int. Cl.
*H04W 72/00* (2009.01)
*H04W 76/06* (2009.01)
*H04W 76/04* (2009.01)

(52) U.S. Cl.
CPC .......... *H04W 72/005* (2013.01); *H04W 76/043* (2013.01); *H04W 76/06* (2013.01)

(58) Field of Classification Search
CPC ....... H04W 4/06; H04W 16/26; H04W 24/02; H04W 84/12; H04W 84/047; H04W 72/005; H04W 76/002; H04L 5/001; H04L 69/16; H04L 69/24; H04L 69/163
USPC ........................... 370/312, 315, 338; 709/237
See application file for complete search history.

(56) References Cited

U.S. PATENT DOCUMENTS

| 8,750,273 B1* | 6/2014 | Shukla ........................ 370/338 |
| 2006/0034196 A1* | 2/2006 | Casey .......................... 370/278 |

(Continued)

FOREIGN PATENT DOCUMENTS

| JP | 2008532346 A | 8/2008 |
| WO | WO-2006081123 A2 | 8/2006 |

OTHER PUBLICATIONS

IEEE 802.11-2007, "IEEE Standard for Information Technology-Telecommunications and Information Exchange Between Systems—Local and Metropolitan Area Networks—Specific Requirements", Part 11: Wireless LAN Medium Access Control (MAC) and Physical Layer (PHY) Specifications, (Jun. 12, 2007).

(Continued)

*Primary Examiner* — Edan Orgad
*Assistant Examiner* — Steven Willmore
(74) *Attorney, Agent, or Firm* — Kevin Cheatham

(57) ABSTRACT

An apparatuses and methods of tearing down a direct communication link are disclosed. In one innovation, a wireless communication apparatus for communicating with two or more communication devices includes a memory unit configured to store network information of a communication link between the apparatus and a first network communication device and store direct link information of a direct link between the apparatus and a second wireless communication device, a processor operationally coupled to the memory unit, the processor configured to retrieve the direct link information from the memory unit and determine that a direct link between the apparatus and the second device is inoperative, and further configured to generate a first frame indicating that the direct link is inoperative, and a transmitter operationally coupled to the processor, the transmitter configured to transmit the first frame for notifying at least the second device that the direct link is inoperative.

43 Claims, 11 Drawing Sheets

(56) References Cited

U.S. PATENT DOCUMENTS

| | | | |
|---|---|---|---|
| 2006/0165035 A1* | 7/2006 | Chandra et al. | 370/329 |
| 2007/0009053 A1* | 1/2007 | Laroia et al. | 375/260 |
| 2007/0287384 A1* | 12/2007 | Sadri et al. | 455/63.4 |
| 2009/0022125 A1* | 1/2009 | Seok | 370/338 |
| 2009/0168689 A1* | 7/2009 | Itagaki et al. | 370/315 |
| 2010/0124172 A1* | 5/2010 | Tenny et al. | 370/242 |
| 2010/0265864 A1* | 10/2010 | He et al. | 370/311 |
| 2011/0034127 A1* | 2/2011 | Wentink et al. | 455/41.2 |
| 2011/0069689 A1* | 3/2011 | Grandhi et al. | 370/338 |
| 2011/0103264 A1 | 5/2011 | Wentink | |
| 2011/0246611 A1* | 10/2011 | Jabara et al. | 709/217 |
| 2012/0120892 A1* | 5/2012 | Freda et al. | 370/329 |
| 2012/0151089 A1* | 6/2012 | Ponmudi et al. | 709/237 |
| 2012/0155343 A1* | 6/2012 | Wentink | 370/310 |
| 2012/0163261 A1* | 6/2012 | Vedantham et al. | 370/311 |
| 2012/0230316 A1 | 9/2012 | Seok | |
| 2012/0314663 A1* | 12/2012 | Dwivedi et al. | 370/329 |

OTHER PUBLICATIONS

"IEEE Std 802.11z: IEEE Standard for Information Technology—Amendment 7: Extensions to Direct-Link Setup", IEEE Computer Society 3 Park Avenue New York, NY 10016-5997 http://ieeexplore.ieee.org/xpl/freeabs alljsp"amumber=5605400 Oct. 14, 2010, 96 pages.

Lin, et al., "ARP-like Direct Link Transmission Scheme in WLAN", Proceedings of the 3rd International Conference on Ubiquitous Information Management and Communication (ICUIMC '09), 2009, pp. 26-31.

Wentink, et al., IEEE P802.11 Wireless LANs: Tunneled direct link setup (TDLS). Sep. 2007, 25 pages.

Yoon, et al., "miDLS: Multi-channel Inter-BSS Direct Link Setup in IEEE 802.11 WLANs," The 19th Joint Conference on Communication and Information (JCCI 2009).

International Search Report—PCT/US2012/054462—ISA/EPO—Nov. 29, 2012.

* cited by examiner

US 9,144,056 B2

BROADCAST TEARDOWN APPARATUS AND METHOD

CROSS-REFERENCE TO RELATED APPLICATIONS

The disclosure claims priority to U.S. Provisional Patent Application No. 61/533,146 filed Sep. 9, 2011 entitled "BROADCAST TEARDOWN APPARATUS AND METHOD," which is assigned to the assignee hereof, and is considered part of, and is incorporated by reference in, this disclosure.

BACKGROUND

1. Field of the Invention

This disclosure relates generally to apparatus and methods of broadcast teardown. More particularly, the disclosure relates to broadcast teardown of a direct link between stations (STAs) that were previously set up using the tunneled direct link setup (TDLS) protocol.

2. Description of the Related Art

The wireless communication environment in a home or an office typically comprises a number of independently developed radio access technologies and standards. These technologies were initially designed for target applications and they perform relatively well for these applications. In a typical home or office environment, an access to content, (e.g., web, video, etc.), is provided to a broadband modem through the home-owner's IP backhaul connection. For instance, mobile services are provided through the cellular network, through either a macro cell or a femto cell located within the home or office. Wireless local area network (WLAN) access points (APs) provide data connectivity between computers, laptops, printers, etc. using 802.11-based WiFi technology.

The 802.11 direct link setup (DLS) standards support a direct link feature which allows a bidirectional connection from one STA to one peer STA such that frames do not pass through an AP. Once the direct link has been set up, all frames between the two STAs may be exchanged directly. This direct link provides a means for efficiently using the wireless medium as traffic does not need to be routed through the AP.

IEEE Standard 802.11z defines a TDLS protocol, which can be used to set up a direct link between STAs that are associated with a same AP. The main objective of 802.11z is to provide an AP-independent DLS. DLS signaling frames are encapsulated in data frames so that they are transferred via an AP transparently. This may result in a simplified two-way handshake which does not require any TDLS feature to be implemented within the AP.

There is a potential problem with existing DLS or TDLS protocols. For example, when two SATs communicate with each other using a direct link, one STA in a direct link may suddenly lose its direct link state before it can inform the peer STA. This may be because its software crashes or due to some other unexpected reasons. As a result, the peer STA may not notice that the direct link between the two STAs is lost by itself. It still believes that the direct link is available. Furthermore, the peer STA may still try to send a frame via the non-functional direct link. On the other hand, any frames sent by the peer STA via the non-functional direct link may still get acknowledged on a media access control (MAC) layer if there is no error associated with it. Therefore, there is an ambiguity on the direct link state between these two STAs. For example, the peer STA may send an Acknowledgement (ACK) to the STA. However, after the acknowledged frame and ACK are further analyzed by the STA, both will be discarded because the they are sent on the non-functional direct link with the peer STA. In addition, because there may be another ACK previously sent by the STA and received by the peer STA, the peer STA may not be aware of this breakdown of the direct link between the two STAs. Therefore, there is a need for a mechanism for doing a state synchronization between STAs so that all involved STAs receive an update of which direct link is lost recently.

SUMMARY OF THE INVENTION

Various implementations of systems, methods and devices within the scope of the appended claims each have several aspects, no single one of which is solely responsible for the desirable attributes described herein. Without limiting the scope of the appended claims, some prominent features are described herein.

One aspect of the subject matter described in the disclosure provides an apparatus for communicating with two or more communication devices, including a memory unit configured to store a first frame received from a first communication device, the first frame identifying that a direct communication link between the first device and a second communication device is inoperative, a processor operationally coupled to the memory unit, the processor configured to retrieve the information from the memory unit and determine a second frame using information from the first frame, the second frame indicating that the direct communication link is inoperative, and a transmitter operationally coupled to the processor, the transmitter configured to transmit the second frame for notifying at least the second communication device that the direct communication link is inoperative. In some implementations the apparatus is an Access Point (AP), and the first and second communication devices may be wireless communication devices that are configured to communicate with each other through a direct wireless communication link configured to allow the exchange of signals between the first and second communication devices that do not go through any other device.

Various implementations of such apparatuses may include one or more of the certain different aspects, some examples of which are recited below and others described herein. In one aspect, the first frame includes information identifying the first device and the second device. The frame may comprise information identifying the access point. In one aspect the first frame includes information identifying the first device. In another aspect, the direct communication link is a link set up using tunneled direct link setup (TDLS) protocol. In one aspect the first frame includes information indicating the frame is a TDLS teardown frame, and information identifying at least one of the first station and the second station.

Another innovation includes a method of communicating with two or more communication devices. The method may include receiving a first frame identifying a direct communication link between a first wireless communication device and at least a second wireless communication device is inoperative, and sending a second frame indicating that the direct communication link is inoperative. The method may further include determining that the direct communication link between the first device and the second device in inoperative, sending the first frame to a third communication device configured to communicate at least in part over a wireless network, receiving the second frame at the second device, and configuring the second device to no longer use the direct communication link based on the received second frame. In one aspect, the second frame includes information based on information in the first frame. In one aspect, the first frame is received by a third communication device configured to communicate at least in part over a wireless network, and wherein sending the second frame is performed by the third device.

In one aspect, the third communication device is an Access Point (AP). The method may further comprise configuring a fourth communication device to no longer use a direct communication link that had been established between the fourth communication device and the first communication device. The method may further comprise determining that the direct communication link between the first device and the second device in inoperative, sending the first frame to a third communication device configured to communicate at least in part over a wireless network, receiving the second frame at the second device, and configuring the second device to no longer use the direct communication link based on the received second frame. In one aspect, the first and second communication devices are wireless communication devices that are configured to communicate with each other through a direct wireless communication link configured to allow the exchange of signals between the first and second communication devices that do not go through any other device. In another aspect, the first frame includes information identifying the first device. The first frame may include information identifying the second device. The first frame may further include information identifying the third communication device. The direct communication link is a link set up using tunneled direct link setup (TDLS) protocol. In one aspect, the first frame may include a TDLS teardown frame.

Another innovation includes an apparatus for communicating with two or more communication devices, the apparatus including means for receiving a first frame identifying a direct communication link between a first wireless communication device and at least a second wireless communication device is inoperative, and means for sending a second frame indicating that the direct communication link is inoperative.

Another innovation includes a wireless communication apparatus for communicating with two or more communication devices, the apparatus including a memory unit configured to store network information of a communication link between the apparatus and a first network communication device and store direct link information of a direct link between the apparatus and a second wireless communication device, a processor operationally coupled to the memory unit, the processor configured to retrieve the direct link information from the memory unit and determine that a direct link between the apparatus and the second device is inoperative, and further configured to generate a first frame indicating that the direct link is inoperative, and a transmitter operationally coupled to the processor, the transmitter configured to transmit the first frame for notifying at least the second device that the direct communication link is inoperative. In one aspect, the first network communication device is an Access Point (AP), and wherein the apparatus and the second communication devices are wireless communication devices that are configured to communicate with each other through a direct wireless communication link configured to allow the exchange of signals between the first and second communication devices that do not go through any other device. In another aspect, the first frame includes information identifying the first device and the second device. In another aspect, the first frame further includes information identifying the first device. In another aspect, the first frame includes information identifying the apparatus. In another aspect, the direct communication link is a link set up using tunneled direct link setup (TDLS) protocol. In another aspect, the first frame includes information indicating the frame is a TDLS teardown frame, and information identifying the apparatus.

In another innovation, a method of communicating with two or more communication devices includes determining a direct communication link between a first wireless communication device and at least a second wireless communication device is inoperative, generating a first frame indicating that the direct communication link is inoperative, sending the first frame to a third wireless device configured to communicate at least in part over a wireless network for notifying at least the second wireless communication device that the direct link is inoperative. The method may further comprise receiving the first frame at the third device, and sending a second frame from the third device, the second frame indicating that the direct communication link between the first device and at least the second device is inoperative. In another aspect, the second frame includes information based on information in the first frame. In another aspect, the third device is an Access Point (AP). The method may further include receiving the second frame at the third device, and configuring the third device to no longer use the direct communication link that had been established between the first communication device and the second communication device. The method can further include establishing a direct communication link between a fourth wireless communication device and the first device, receiving the second frame at a fourth wireless communication device, and configuring the fourth device to no longer use the direct communication link based on the received second frame. In one aspect, the first and second communication devices are wireless communication devices that are configured to communicate with each other through a direct wireless communication link configured to allow the exchange of signals between the first and second communication devices that do not go through any other device. In another aspect, the first frame includes information identifying the first device. In another aspect, the first frame includes information identifying the second device. In another aspect, the first frame further includes information identifying the third communication device. In one aspect, the direct communication link is a link set up using tunneled direct link setup (TDLS) protocol.

Another innovation includes a wireless communication apparatus for communicating with two or more communication devices including means for storing network information of a communication link between the apparatus and a first network communication device and direct link information of a direct link between the apparatus and a second wireless communication device, means for computing operationally coupled to said storing means, said computing means configured to retrieve the direct link information from said storing means and determine that a direct link between the apparatus and the second device is inoperative, said computing means further configured to generate a first frame indicating that the direct link is inoperative, and means for transmitting operationally coupled to said computing means, said transmitting means configured to transmit the first frame for notifying at least the second device that the direct communication link is inoperative. In various aspects, said storing means may include a memory unit, the computing means may include a processor, and/or said transmitting means may include a wireless transmitter.

Details of one or more implementations of the subject matter described in this specification are set forth in the accompanying drawings and the description below. Other features, aspects, and advantages become apparent from the description, the drawings, and the claims. Note that the relative dimensions of the following figures may not be drawn to scale.

Figure 1:
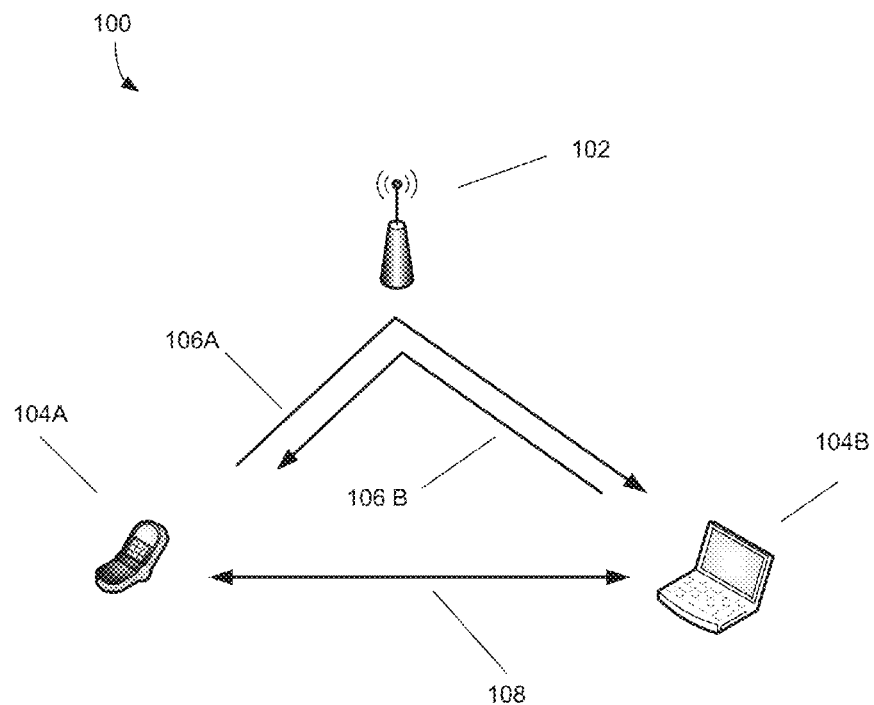
FIG. 1 is a diagram showing WLAN according to at least one illustrative implementation.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION OF CERTAIN IMPLEMENTATIONS

The detailed description set forth below in connection with the appended drawings is intended as a description of exemplary implementations of the disclosure and is not intended to represent the only implementations in which the disclosure may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations of the disclosure. In some instances, some devices are shown in block diagram form.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Various implementations of a TDLS direct link teardown method and apparatus are described herein below.

As standardized in IEEE standards, such as IEEE 802.11e and IEEE 802.11z, a DLS or TDLS provides a capability for connecting at least two STAs. FIG. 1 shows a conventional IEEE 802.11 WLAN 100 comprising an AP 102 passing traffic between at least two STAs 104A and 104B in an infrastructure mode over connections 106A and 106B respectively. In the infrastructure mode, when the STA 104A wants to communicate with the peer STA 104B, it may send a frame to the AP 102 at first. After receiving the frame from the STA 104A, the AP 102 may decode the frames and make sure if it can successfully decodes all information inside it. Upon successfully decoding a frame, the AP 102 may check a destination which the frame are sent to and thereafter forward it accordingly. In one implementation, frames sent by the STA 104A may be forward to the peer STA 104B over the connection 106A via the AP 102. At the same time, the peer STA 104B may send a frame to the STA 104A over the connection 106B via the AP 102 too. A DLS or TDLS is a mechanism that allows the STAs 104A and 104 B to establish a direct connection 108 without additionally passing through the AP 102. This means that frames to be exchanged between the STAs 104A and 104B may be directly sent over the connection 108 instead of either the connection 106A or 106B. This kind of direct links provide a means for efficiently using wireless frequency spectrum, especially when both STAs are physically located to be close to each other. However, the DLS as specified by the IEEE standard 802.11e has several limitations. One limitation is that it is AP-dependent.

IEEE 802.11z standard developed several extensions to IEEE 802.11e DLS. IEEE 802.11z defines a tunneled DLS or TDLS. One TDLS feature is to provide an AP-independent DLS mechanism for minimizing the involvement by an associated AP. In one example, the STA 104A sends a direct link setup request frame to the peer STA 104B via the AP 102, as shown in FIG. 1. The peer STA 104B may reply with a response frame to the STA 104A via the AP 102 too. Different to a regular IEEE 802.11e DLS signaling frame, a TDLS signaling frame is encapsulated in a MAC data frame so that it is transferred via an AP transparently. As shown in FIG. 1, this means that the AP 102 may have no information of any TDLS signaling frame that is passing through it. This may result in a simplified two-way handshake and this two-way handshake does not require any TDLS feature to be implemented within an AP. This may simplified a deployment of TDLS features in existing communication networks.

Figure 2:
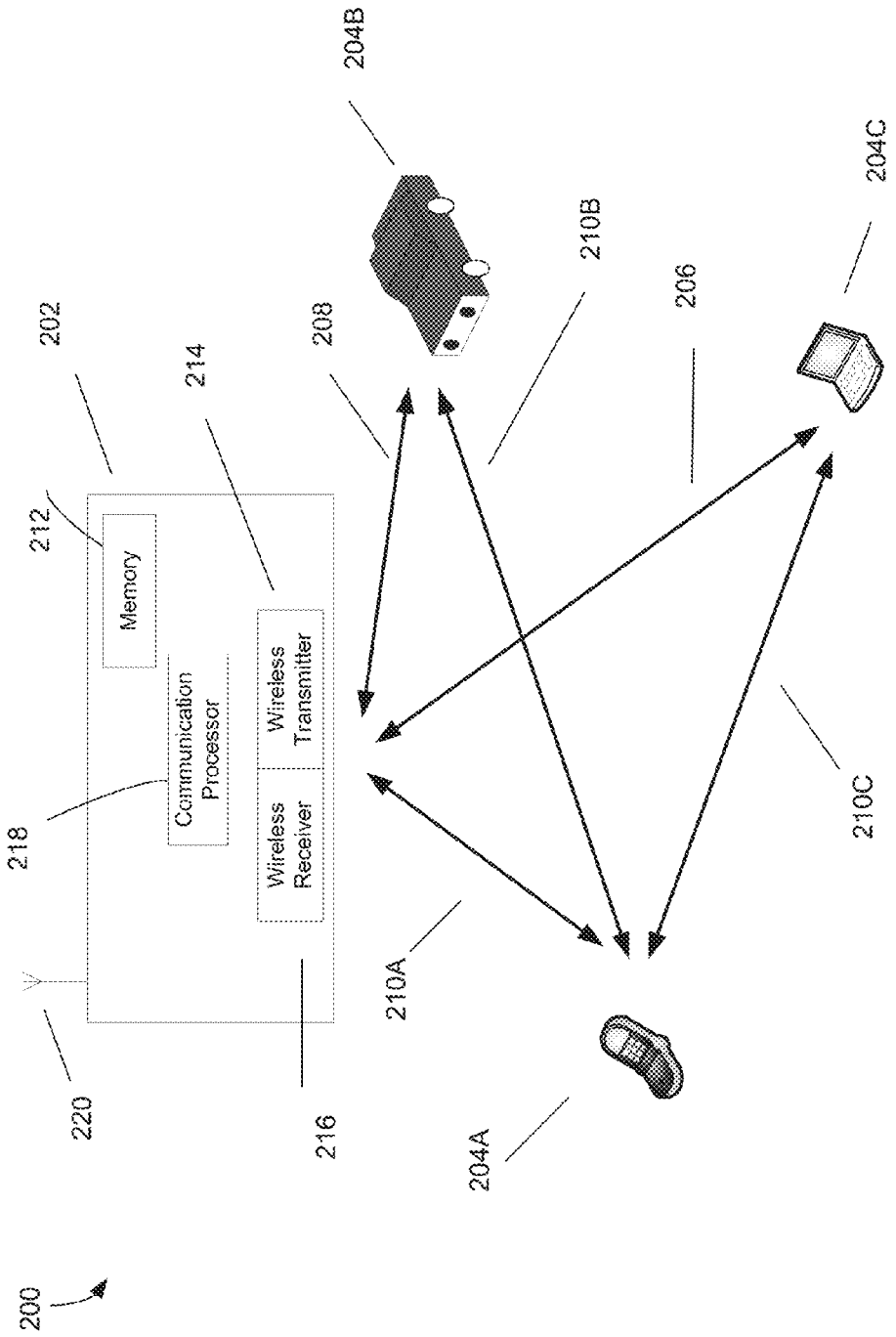
FIG. 2 is a diagram of a wireless AP of a WLAN according to at least one illustrative implementation.

FIG. 2 shows a WLAN 200 and a wireless AP 202 according to a preferred implementation of the present disclosure. Although in the described implementations, the elements of WLAN 200 are presented in one arrangement, other implementations may feature other arrangements, as will be apparent to one skilled in the relevant arts based on the disclosure and teachings provided herein. The WLAN 200 comprises the AP 202, a plurality of STAs, e.g., STAs 204A-C. As shown in FIG. 2, the AP 202 further comprises at least a wireless transmitter 214 for sending signals to a plurality of STAs, a wireless receiver 216 for receiving signals from a plurality of STAs, an antenna 220, a communication processor 218 for handling physical (PHY) layer, MAC layer and application layer communication and signaling between the AP 202 and a plurality of STAs. The AP 202 further comprises a memory 212 for storing any communication and application related data. The communication processor 218 is at least coupled to the wireless receiver 216, the wireless receiver 214 and the memory 212. Both the wireless receiver 216 and the wireless 214 are coupled to the antenna 220 for receiving and transmitting wireless electromagnetic signals. The STA 204A is implemented according to one or more implementations of the present disclosure, while the STAs 204B and 204C can be implemented according to implementations of the present disclosure, or as conventional wireless clients. As shown in FIG. 2, the STA 204A can communicate with the STAs 204B and 204C in an infrastructure mode through the AP 202 over connections 206, 208 and 210A. When a DLS or TDLS is enabled in the WLAN 220, direct links 210B and 210C may be setup between the STA 204A and the peer STAs 204B and 204C. As such, the STA 204A may exchanges frames with the peer STAs 204B and 204C respectively over one of the direct links 210B and 210C.

Figure 3:
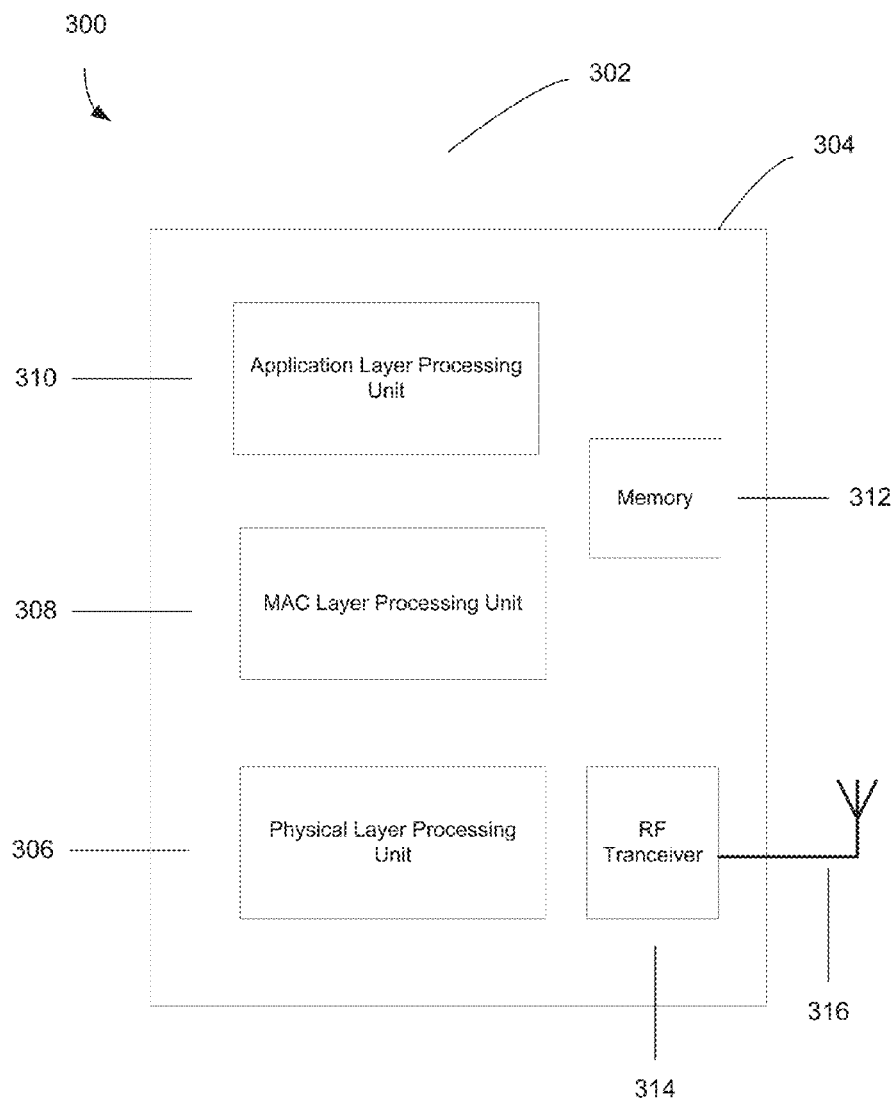
FIG. 3 is a diagram of a wireless STA of a WLAN according to at least one illustrative implementation.

FIG. 3 shows details of one exemplary implementation of the STA 104A as shown in FIG. 1 and the STA 204A as shown in FIG. 2 according to a preferred implementation of the present disclosure. Although in the described implementations, the elements of a STA 302 are presented in one arrangement, other implementations may feature other arrangements, as will be apparent to one skilled in the relevant arts based on the disclosure and teachings provided herein. In one implementation, elements of the STA 302 can be implemented in hardware, software, or any combination thereof. As shown in FIG. 3, the STA 302 comprises a PHY layer processing unit 306, a memory 312, a radio frequency (RF) transceiver 314 and an antenna 316. It may further comprise a host 304, a MAC layer processing unit 308 and an application layer processing unit 310. The PHY layer processing unit 306 is coupled to the RF transceiver 314 and the memory 312 for receiving and transmitting wireless signals. In one implementation, the RF transceiver 314 may be similar to a combination of the wireless receiver 216 and the wireless transmitter 214 as shown in FIG. 2. The MAC layer processing unit 308 is at least coupled to the PHY layer processing unit 306 and the memory 312. The MAC layer processing unit 308 receives application layer data packets from the application layer processing unit 310 and accordingly generates MAC layer data frames. After this, the MAC layer processing unit 308 may send the MAC layer data frames via the PHY layer processing unit 306, the RF transceiver 314 and the antenna 316. The application layer processing unit 310 is at least coupled to the MAC layer processing unit 308 and the memory 312. In some implementations, the application layer processing unit 310 may be further coupled to the PHY layer processing unit 306 and even the RF transceiver 314. The STA 302 is preferably compliant with all or part of IEEE standard 802.11, including draft and approved amendments such as 802.11a, 802.11b, 802.11e, 802.11g, 802.11i, 802.11k, 802.11n, 802.11v, and 802.11w.

Figure 4:
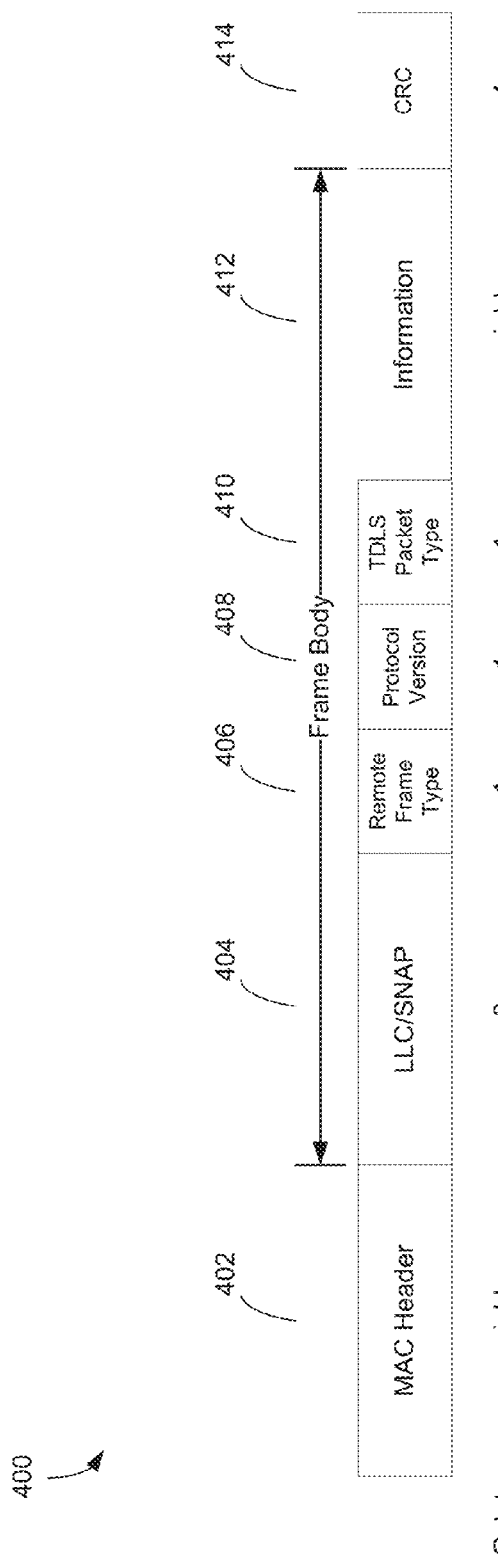
FIG. 4 is a diagram of information included in a MAC frame associated with a TDLS procedure, in accordance with various implementations.

FIG. 4 is a diagram illustrating a format of a MAC frame for an exemplary TDLS procedure. A TDLS MAC frame 400 of this format is typically sent by a STA to a peer STA through an AP in a TDLS wireless network. Referring to FIG. 4, the TDLS MAC frame 400 includes a MAC header field 402, a logical link control (LLC) or sub-network access protocol (SNAP) field 404, a remote frame type field 406, a TDLS packet type field 410, an information field 412, and a cyclic redundancy code (CRC) field 414. The MAC header field 402 contains information common to almost all types of MAC frames. For instance, the MAC header field 402 may further include a frame control field, a duration field, a sequence control field, a plurality of address fields and an optional quality of service (QoS) control field. The remote frame type field 406 may be set to a value (for example, "2") indicating that the current frame is a TDLS frame. The TDLS MAC frame 400 may further include a protocol version field 408. The protocol version field 408 may be set to a value indicating a protocol version of a message to be transmitted and received. The information field 412 of the TDLS MAC frame 400 includes a variety of information individually specified depending on types of TDLS frames and the included information is different depending on the TDLS types. The CRC field 414 includes additional information for correcting an error of the TDLS MAC frame 400.

Figure 5:
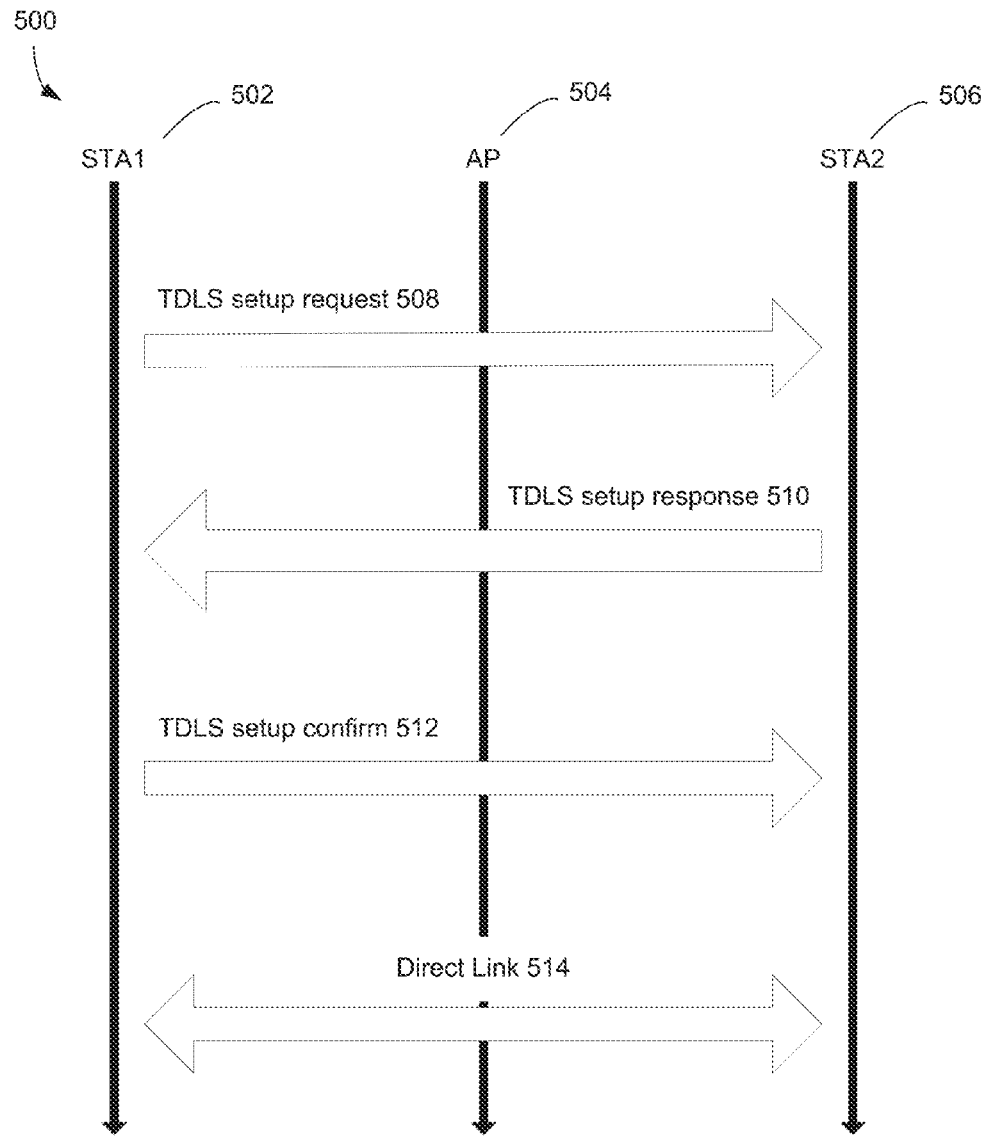
FIG. 5 is a message flow diagram illustrating an exemplary TDLS procedure, in accordance with various implementations.

FIG. 5 shows an exemplary frame exchanges between two STAs 502 and 506 and an AP 504 in a wireless LAN according to an implementation of the present invention. Before a TDLS direct link is setup for a data exchange between two STAs, a series of frame exchanges between these two STAs for initiating and confirming the DLS direct link. At the beginning, the initiating STA 502 issues a TDLS setup request 508 directed at the target STA 506. The TDLS request message may be encapsulated and is sent through the AP 504. This frame includes information about capabilities of the requesting STA 502. After issuing the TDLS setup request 508, the initiating STA 502 may enter a listening window during which it expects to receive a TDLS response. After successfully receiving the TDLS setup request 508, the STA 506 may respond with a TDLS setup response 510. This TDLS setup response frame may also be tunneled through the AP 504 and include information about capabilities of the target STA 506. In addition, the TDLS setup response frame may further comprise a status code indicating that either accepts or rejects the TDLS setup request 508. If the initiating STA 502 receives the TDLS setup response 510 within a listening window and the status code of the TDLS setup request 508 indicates the setup request is accepted, it replies with a TDLS setup confirm 512 via the AP 504. At this point, a direct link 514 between the STAs 502 and 506 is established and the two STAs may begin to communicate directly.

Figure 6:
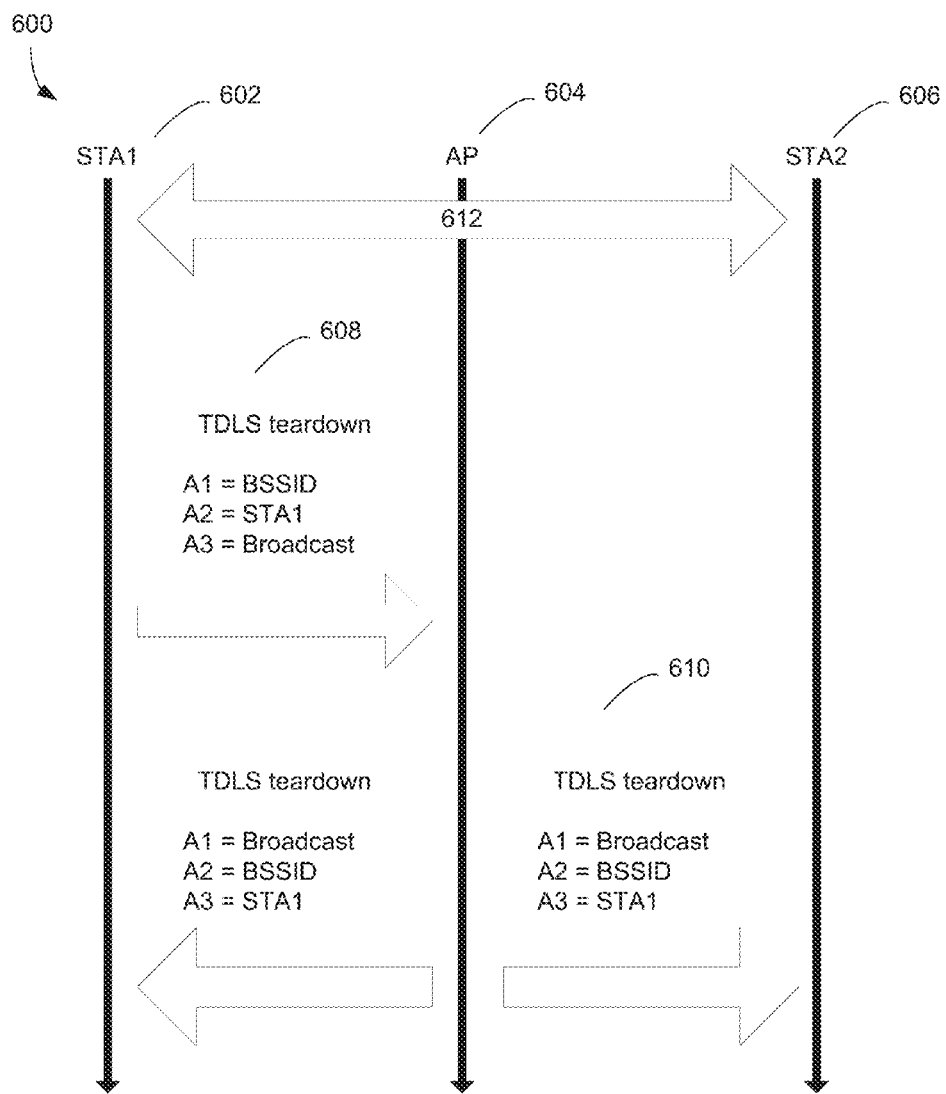
FIG. 6 is a message flow diagram illustrating an exemplary TDLS teardown procedure, in accordance with various implementations.

FIG. 6 shows a message flow diagram illustrating an exemplary TDLS teardown procedure. In a situation when a STA detects that communication over a direct link to another peer STA experiences difficulties, the STA may decide this direct link is broken and non-functional any more. However, the peer STA may not be aware of this situation. In order to avoid an ambiguity this may bring and synchronize a TDLS state between the two STA, the STA needs a mechanism to inform the peer STA of the TDLS state and accordingly tear down the direct link. One implementation of this mechanism is shown in FIG. 6. At the beginning, a STA 602 is in a TDLS direct link 612 with a peer STA 606 in a communication network 600. At some point, because software crashes or due to some other reasons, the STA 602 may lose any communication over the direct link 612 with the peer STA 606. As shown in FIG. 6, a TDLS teardown frame 608 is sent by the STA 602 to an AP 604 that the peer STA 606 is currently associated with when the STA 602 detects that the TDLS direct link 612 is lost and non-functional. In one implementation, the STA 602 may broadcast this TDLS teardown frame 608 to all available communication links it may use, including a link to the AP 604. After successfully receiving the TDLS teardown frame 608 from the STA 602, the AP 604 will generate another TDLS teardown broadcast frame 610 and broadcasts the TDLS teardown broadcast frame 610 to other STAs associated with it, including the peer STA 606. As such, other STAs will be notified via the AP 604 that the direct link 612 no longer exists. In one implementation, STA1 may send a broadcast TDLS teardown frame 608 every time it associates with an AP.

As shown in FIG. 6, the TDLS teardown frame 608 sent by the STA 602 comprises a Basic Service Set Identifier (BSSID) in its Immediate Receiver field A1. This Immediate Receiver field A1 identifies the AP 604, which is associated with the STA 602, as an immediate receiver. The TDLS teardown frame 608 may also include information of the sending device in its Immediate Transmitter field A2. In this case, the Immediate Transmitter field A2 is filled with an identifier (ID) of the STA 602. In addition, the TDLS teardown frame 608 includes information to be broadcasted to all other STAs associated with the AP 604. In one implementation, the STA 602 sets an Ultimate Destination field A3 of the TDLS teardown frame 608 set to be 'Broadcast.' This means that this TDLS teardown frame 608 is to be broadcasted to other STAs by a receiver.

Upon receiving the TDLS teardown frame 608 sent by the STA 602, the associated AP 604 generates another TDLS teardown broadcast frame 610 as a frame to be broadcasted to all STAs associated with it and then send this broadcast frame 610 as shown in FIG. 6. The TDLS teardown broadcast frame 610 sent by the AP 604 has an Immediate Receiver field A1 configured to be 'Broadcast,' an Immediate Transmitter field A2 configured to be the BSSID of the AP 604, and an Immediate Source field A3 set to be the ID of the STA 602. After it receives the TDLS teardown broadcast frame 610 sent by the AP 604 to its associated STAs including the peer STA 606, the peer STA 606, which had the direct link 612 established with the STA 602 but did not know that the direct link 612 no longer exists, may be informed of that the direct link 612 being faulty and thus torn down. Other STAs that are associated with the AP 604 and that receive the TDLS teardown broadcast frame 610 may simply ignore it, since the direct link teardown broadcast frame 610 does not apply to them. For example, in some implementations upon receiving the TDLS Teardown frame sent by a STA, the AP then broadcasts or bridges a TDLS Teardown frame, which means that the AP may changes the MAC header but nothing else.

TABLE 1

| Order | Information | Notes |
|---|---|---|
| 1 | Category | The Category field is set to a value for TDLS. |
| 2 | Action | The Action field is set to 3, representing TDLS Teardown |
| 3 | Reason Code | Indicates why a direct link is inoperative (optional) |
| 4 | FTIE | Included if TDLS peer key (TPK) handshake was successful for this session (optional) |
| 5 | Link Identifier | Identifies a particular direct communication link |

An example of additional information of the TDLS teardown frame 608 is shown in Table 1, in accordance with some implementations. As illustrated in Table 1, a Category field of Order 1 may be set to TDLS for indicating that a frame is a TDLS frame. An Action field of Order 2 may be configured to a value of 3 for indicating an action of a TDLS teardown. A value of this Action field may be protocol-driven, and it may be configured to a different value for a TDLS teardown for a different protocol used in a communication network. A Reason Code information field of Order 3 may be set to a value indicating a reason for a TDLS teardown, e.g., a software crash at a STA. The value of this field may also be a protocol-driven value in some implementations. A FTIE field of Order 4 may be an optional field that is included in a TDLS teardown frame if a TDLS peer key (TPK) handshake succeeded in a session. In one implementation, the FTIE field may be left blank if a TDLS teardown frame is not concerned with such TPK handshake information. Alternatively, in some implementations, this field may be used for providing additional information such as information that may be used to set up a future direct link between STAs. A Link Identifier field of Order 5 provides link identifier information for identifying a direct link. The Link Identifier field may include a link identifier element.

Figure 7:
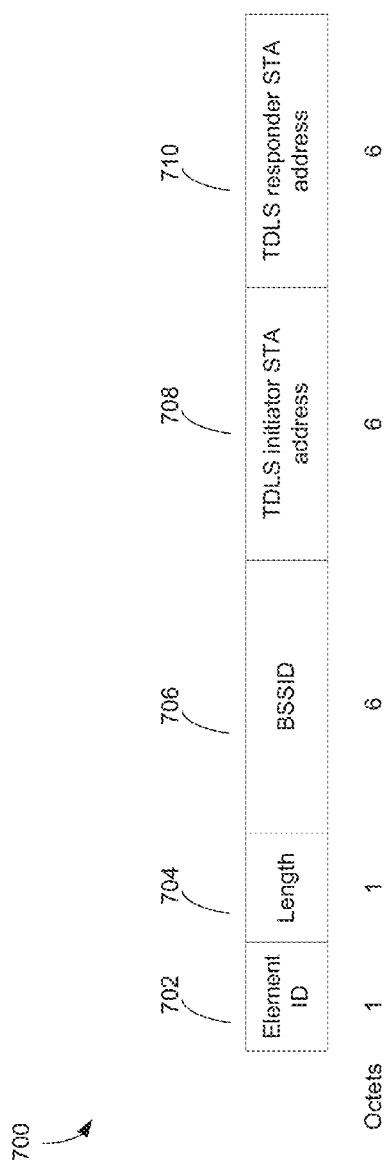
FIG. 7 is a diagram of information included in a link identifier element field of a TDLS teardown frame, in accordance with various implementations.

A Link Identifier field shown in Table 1 may be protocol-driven in some implementations. In one implementation, a TDLS teardown frame 608 as shown in FIG. 6 may contain a link identifier element that includes a broadcast address. This broadcast address may be a TDLS responder STA address. FIG. 6 shows a message flow diagram of an exemplary TDLS teardown procedure and illustrates some fields included in a TDLS teardown frame 608. Another implementation of a link identifier element of a TDLS teardown frame is shown in FIG. 7. FIG. 7 shows an exemplary implementation of a link identifier element 700 consistent with implementations of the disclosure, whereby the link identifier element 700 may be protocol-driven and thus may change to suit a particular protocol utilized in a particular network. In one implementation, a TDLS initiator STA address field 708 of the link identifier element 700 may contain an address of the STA 602 as shown in FIG. 6. This address may be sent within the broadcast TDLS teardown frame 608 to the AP 604.

In one implementation, the TDLS initiator STA address field 708 of the link identifier element 700 has a length of 6 octets as shown in FIG. 7. In another implementation, the TDLS initiator STA address field 708 is set to an address of a STA, e.g., the STA 602 as shown FIG. 6, a TDLS responder STA address field 710 is set to be 'Broadcast,' and a BSSID field is set to be an ID of an AP, e.g., the ID of the AP 604 as shown in FIG. 6. Other configurations of the link identifier element may also be envisioned, e.g., different types and number of fields and different sizes of the fields, while remaining within the spirit and scope of the disclosure.

In one implementation, as shown in FIG. 6, based on information in the TDLS teardown frame 610 sent by the AP 604 to STAs associated with it, the STAs receiving the TDLS teardown frame 610 may know which direct link currently in use is no longer functional and therefore it has been or is to be torn down. Accordingly, the STAs will not send next frames to other STAs via the direct link, e.g., the direct link 612, which no longer exists. Also, this may speed up a new process for STAs to set up a new direct link with each other. This is because two STAs had a direct link set up before and they may know which direct link no longer works.

Figure 8:
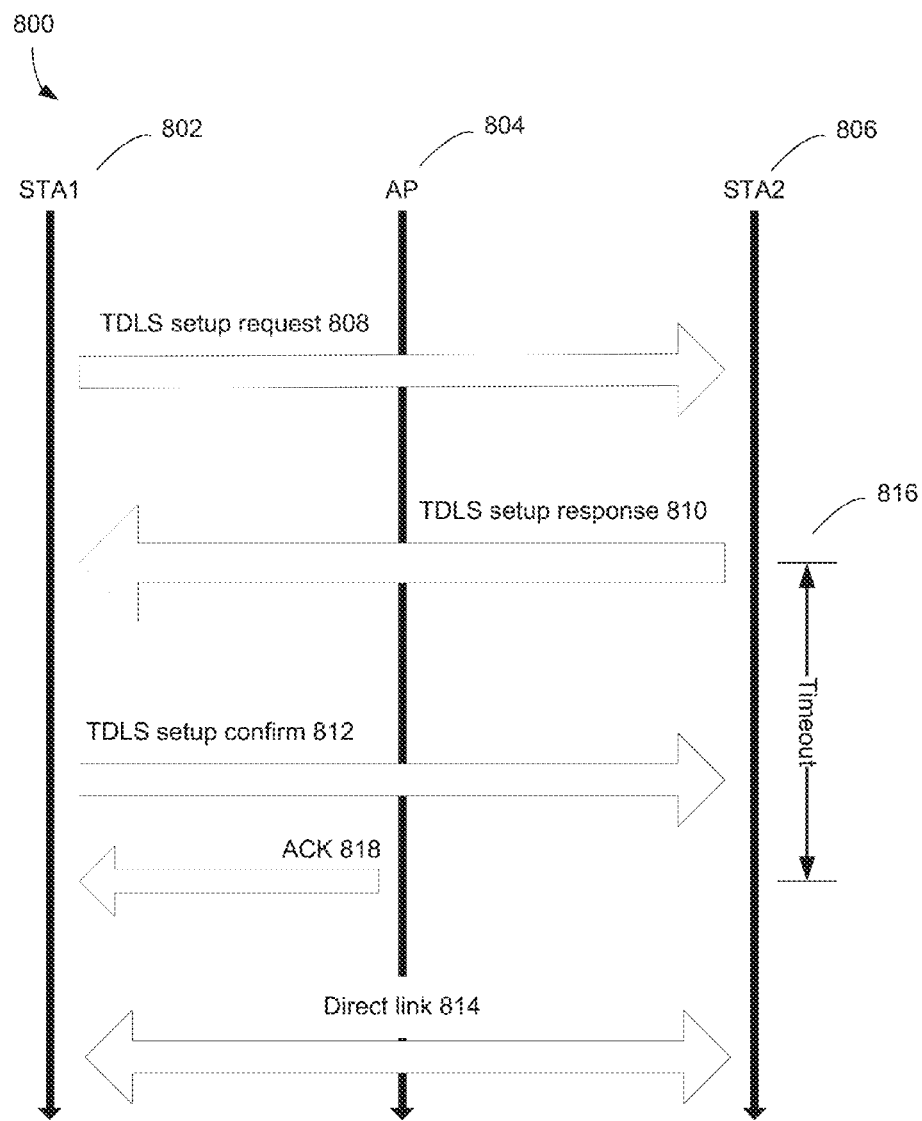
FIG. 8 is a message flow diagram illustrating an exemplary enhanced TDLS procedure, in accordance with various implementations.

FIG. 8 shows another exemplary implementation relating to solving a potential TDLS setup issue which uses the TDLS teardown frame as described in FIG. 7 and Table 1. As shown in FIG. 8, a TDLS setup comprises three frames: a TDLS setup request 808, a TDLS setup response 810 and a TDLS setup confirm 812. All three frames are sent between STAs 802 and 806 via an AP 804. However, it may occur that the TDLS setup confirm frame 812 is lost at the AP 804. In this case, the STA 802 that sent the TDLS setup confirm frame 812 to the AP 804 may still believe that a direct link 814 is in place, even though the STA 806 is still waiting for the TDLS setup confirm frame 812 before activating the direct link 814. To account for this potential problem, a timeout 816 is added between sending the TDLS setup response frame 810 and receiving the corresponding TDLS setup confirm frame 812. When the TDLS setup confirm frame 812 is not received within the timeout 816 after sending the TDLS setup response frame 810, the setup of the TDLS direct link 814 is terminated and the STA 806 waiting for the TDLS setup confirm frame 812 sends a TDLS teardown frame to the STA 802 from which the TDLS setup confirm frame 812 is expected, such as in the manner as described in the above paragraphs. By way of example and not by way of limitation, the timeout 816 is a time value of between 200 milliseconds and 5 seconds.

There may be another potential TDLS setup issue which uses the TDLS teardown frame as previously described in FIG. 7 and Table 1. In one implementation, the TDLS setup confirm frame is sent from the STA 802 to the STA 806 via the AP 804, as shown in FIG. 8. In some cases, it may occur that a transmission from STA1 to the AP may fail many times until a final transmission succeeds. For example, the STA 806 tried 10 consecutive transmission for sending the TDLS setup confirm frame 812 and this may be the maximum number of times the STA 806 can try for sending a frame with a particular data communication protocol until the $10^{th}$ try when it finally succeeds. The AP 804 then sends an ACK frame 818 acknowledging the successful reception of the TDLS setup confirm frame 804. However, the ACK frame 818 itself may get lost and not be received by the STA 802. Therefore, the STA 802 assumes that the TDLS setup confirm frame 812 was not received by the AP 804 and it gets discarded. On the other hand, the TDLS setup confirm frame 812 arrives at the STA 806. Finally the situation becomes the STA 802 assumes that the direct link 814 is not formed while the STA 806 assumes that the direct link 814 is formed. To solve this problem, one solution is when the STA 802 discards the TDLS confirm frame after the STA 802 believed it failed all its retransmissions, the STA 802 may send a TDLS teardown frame via the AP 804 to the STA 806 for erasing any potential direct link state at the STA 806.

Figure 9:
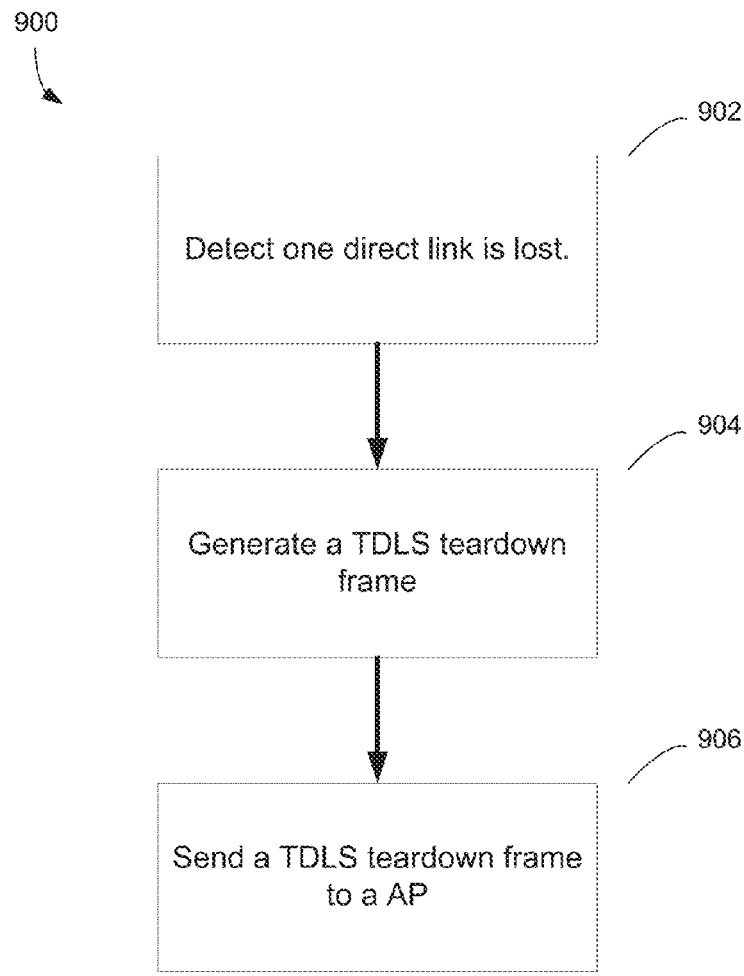
FIG. 9 illustrates a flowchart of an exemplary method of starting a TDLS teardown procedure from a STA.

In one implementation, the STAs 104A and 104B in the wireless network 100 are ready for setting up a direct link to each other via the AP 102. FIG. 9 illustrates a flowchart of an exemplary method of detecting and teardown a broken direct link. The method starts from the block 902 in FIG. 9, wherein a STA starts detecting if there is any issue with an existing direct link or a future direct link setup. In one implementation, the STA 104A in FIG. 1 detects there is an issue with an existing TDLS 108. In one implementation, because frames sent by the STA 104A may not be properly acknowledged by the AP 102 or the peer STA 104B, the STA 104A thinks there may be some issue with the direct link 108 and decides to tear down the TDLS 108. Following the block 902, wherein the STA 104A detects an issue with the existing direct link 108, it may generate a TDLS frame in the block 904. In one implementation, the STA 104A may set a destination of the TDLS frame to be the AP 102 it associates with, it may set the source of the TDLS frame to be its own address and set an action for the TDLS frame to be broadcasted. After the TDLS frame is generated in the block 904, the STA 104A sends it to the AP 102 in the block 906.

Figure 10:
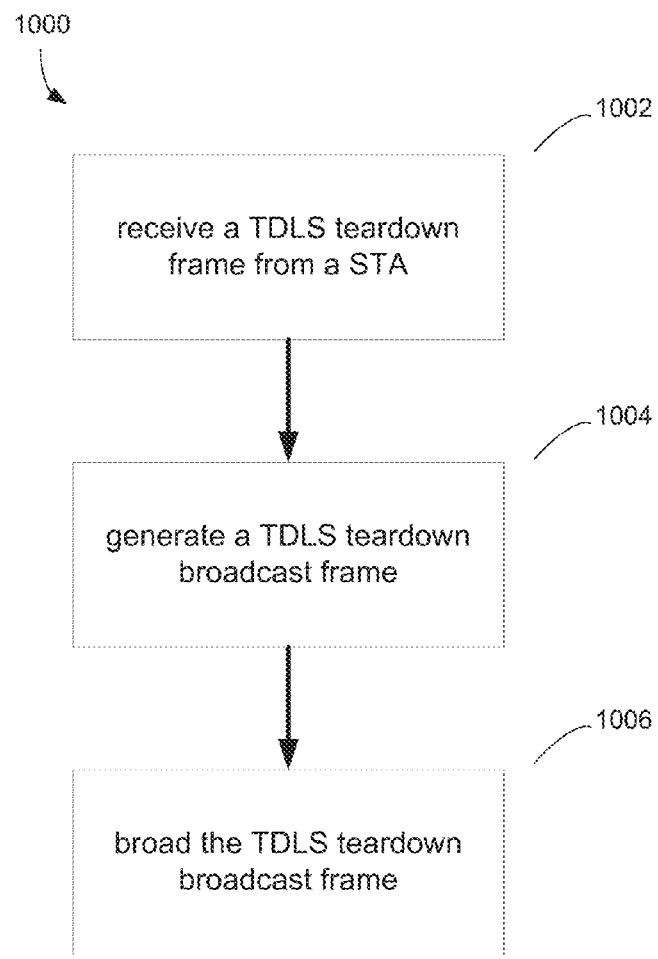
FIG. 10 illustrates a flowchart of an exemplary method of receiving and broadcasting a TDLS teardown message from an AP.

FIG. 10 illustrates another flowchart of an exemplary method of tearing down a broken direct link by the AP 102. The method starts from the block 1002 in FIG. 10, wherein an AP receives a TDLS teardown frame requesting to broadcast a TDLS teardown broadcast frame to STAs associated with it. In one implementation, the AP 102 in FIG. 1 receives a TDLS teardown frame from the STA 104A. One of the possibilities may be because that the STA 104A thinks there may be some issue with the direct link 108 and decides to tear down the TDLS 108. Following the block 1002, the AP 102 may generate a TDLS teardown broadcast frame in the block 1004. In one implementation, the AP 102 may set a destination of the TDLS frame to be broadcast and it may set the source of the TDLS frame as its own address. After the TDLS frame is generated in the block 1004, the AP 102 broadcasts it STAs associated with it in the block 1006.

Figure 11:
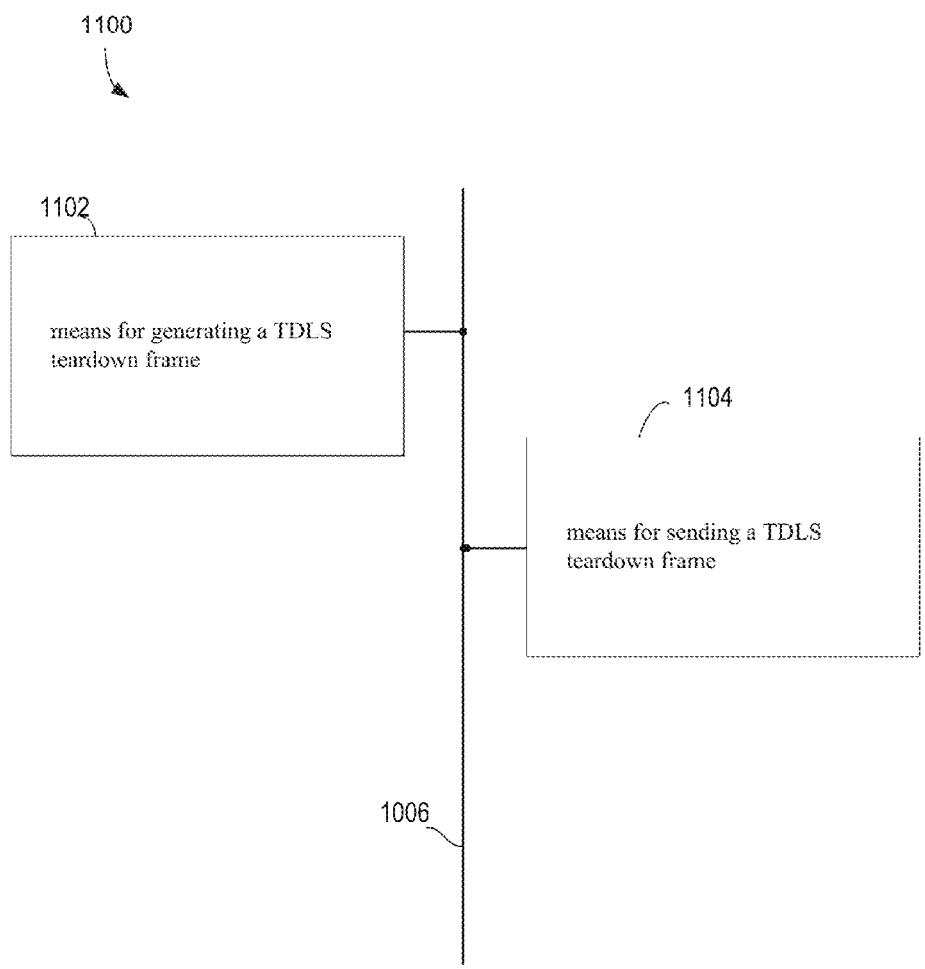
FIG. 11 illustrates a functional diagram of an exemplary apparatus for sending a TDLS teardown message from a STA.

FIG. 11 illustrates a diagram of an apparatus for tearing down a TDLS between STAs 104A and 104B. In one implementation, the means for generating a TDLS teardown frame comprises the MAC layer processing unit 308 and the memory 312. The means for sending a TDLS teardown frame comprises the memory 312, the PHY layer processing unit 306, the RF transceiver 314 and the antenna 316.

The various operations of methods described above may be performed by various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations of the application.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor may read information from, and write information to, the storage medium. In the alternative, the storage medium may be integral to the processor. Disk and disc, as used herein, includes compact disc (CD), laser disc, optical disc, digital versatile disc (DVD), floppy disk and Blu-Ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the applications have been described herein. It is to be understood that not necessarily all such advantages may be achieved in accordance with any particular implementation of the application. Thus, the application may be embodied or carried out in a manner that achieves or optimizes one advantage or group of advantages as taught herein without necessarily achieving other advantages as may be taught or suggested herein.

Various modifications of the above described implementations may be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. An apparatus for communicating with two or more communication devices, wherein the apparatus is an access point, comprising:
   a memory unit configured to store a first frame received from a first communication device, the first frame identifying that a direct communication link between the first communication device and a second communication device is inoperative;
   a processor operationally coupled to the memory unit, the processor configured to retrieve the information from the memory unit and determine a second frame using information from the first frame, the second frame indicating that the direct communication link is inoperative; and
   a transmitter operationally coupled to the processor, the transmitter configured to broadcast the second frame for notifying at least the second communication device that the direct communication link is inoperative.

2. The apparatus of claim 1, wherein the first and second communication devices are wireless communication devices that are configured to communicate with each other through a direct wireless communication link configured to allow the exchange of signals between the first and second communication devices that do not go through any other device.

3. The apparatus of claim 1, wherein the first frame includes information identifying the first communication device and the second communication device.

4. The apparatus of claim 3, wherein the first frame further comprises information identifying the access point.

5. The apparatus of claim 1, wherein the first frame includes information identifying the first communication device.

6. The apparatus of claim 1, wherein the direct communication link is a link set up using a tunneled direct link setup (TDLS) protocol.

7. The apparatus of claim 1, wherein the first frame comprises:
   information indicating that the first frame is a tunneled direct link setup (TDLS) teardown frame; and
   information identifying at least one of the first communication device or the second communication device.

8. A method of an access point communicating with two or more communication devices, the method comprising:
   receiving a first frame identifying that a direct communication link between a first wireless communication device and at least a second wireless communication device is inoperative;
   determining that the direct communication link between the first wireless communication device and the second wireless communication device is inoperative; and
   broadcasting a second frame indicating that the direct communication link is inoperative.

9. The method of claim 8, wherein:
   the access point is configured to communicate at least in part over a wireless network; and
   the second frame is sent to the second wireless communication device for configuring the second wireless communication device to no longer use the direct communication link based on the second frame.

10. The method of claim 8, wherein the second frame includes information based on information in the first frame.

11. The method of claim 8, further comprising:
    configuring a third wireless communication device to no longer use a direct communication link that had been established between the third wireless communication device and the first wireless communication device.

12. The method of claim 8, wherein the first and second wireless communication devices are wireless communication devices that are configured to communicate with each other through a direct wireless communication link configured to allow the exchange of signals between the first and second wireless communication devices that do not go through any other device.

13. The method of claim 8, wherein the first frame includes information identifying the first wireless communication device.

14. The method of claim 13, wherein the first frame includes information identifying the second wireless communication device.

15. The method of claim 8, wherein the first frame comprises information identifying the access point.

16. The method of claim 8, wherein the direct communication link is a link set up using a tunneled direct link setup (TDLS) protocol.

17. The method of claim 16, wherein the first frame comprises a TDLS teardown frame.

18. An apparatus for communicating with two or more communication devices, wherein the apparatus is an access point, comprising:
    means for receiving a first frame identifying that a direct communication link between a first wireless communication device and at least a second wireless communication device is inoperative;
    means for determining that the direct communication link between the first wireless communication device and the second wireless communication device is inoperative; and
    means for broadcasting a second frame indicating that the direct communication link is inoperative.

19. A wireless communication apparatus for communicating with two or more communication devices, comprising:
    a memory unit configured to store network information of a communication link between the apparatus and a first network communication device and store direct link information of a direct link between the apparatus and a second wireless communication device;
    a processor operationally coupled to the memory unit, the processor configured to retrieve the direct link information from the memory unit and determine that the direct link between the apparatus and the second wireless communication device is inoperative, and further configured to generate a first frame indicating that the direct link is inoperative based on the determination that the direct link is inoperative; and a transmitter operationally coupled to the processor, the transmitter configured to broadcast the first frame for notifying at least the second wireless communication device that the direct communication link is inoperative.

20. The apparatus of claim 19, wherein the first network communication device is an Access Point (AP), and wherein the apparatus and the second communication device are wireless communication devices that are configured to communicate with each other through a direct wireless communication link configured to allow the exchange of signals between the apparatus and the second wireless communication device that do not go through any other device.

21. The apparatus of claim 19, wherein the first frame includes information identifying the first network communication device and the second wireless communication device.

22. The apparatus of claim 19, wherein the first frame comprises information identifying the first network communication device.

23. The apparatus of claim 19, wherein the first frame includes information identifying the apparatus.

24. The apparatus of claim 19, wherein the direct communication link is a link set up using a tunneled direct link setup (TDLS) protocol.

25. The apparatus of claim 19, wherein the first frame comprises:
information indicating that the first frame is a tunneled direct link setup (TDLS) teardown frame; and
information identifying the apparatus.

26. A method of communicating with two or more communication devices, the method comprising:
determining a direct communication link between a first wireless communication device and at least a second wireless communication device is inoperative;
generating a first frame indicating that the direct communication link is inoperative based on the determination that the direct communication link is inoperative; and
broadcasting the first frame to a third wireless device configured to communicate at least in part over a wireless network for notifying at least the second wireless communication device that the direct communication link is inoperative.

27. The method of claim 26, wherein the third wireless device:
generates a second frame based on the first frame; and
sends the second frame for indicating that the direct communication link between the first wireless communication device and at least the second device is inoperative.

28. The method of claim 27, wherein the second frame includes information based on information in the first frame.

29. The method of claim 27, wherein the third wireless device is an Access Point (AP).

30. The method of claim 27, wherein:
the second frame is sent to the second wireless communication device for configuring the second wireless communication device to no longer use the direct communication link that had been established between the first wireless communication device and the second wireless communication device.

31. The method of claim 27, further comprising:
establishing a second direct communication link between a fourth wireless communication device and the first wireless communication device,
receiving the second frame at a fourth wireless communication device; and
wherein the second frame is sent to the fourth wireless communication device for configuring the fourth wireless communication device to no longer use the second direct communication link based on the second frame.

32. The method of claim 26, wherein the first and second wireless communication devices are wireless communication devices that are configured to communicate with each other through a direct wireless communication link configured to allow the exchange of signals between the first and second wireless communication devices that do not go through any other device.

33. The method of claim 26, wherein the first frame includes information identifying the first wireless communication device.

34. The method of claim 26, wherein the first frame includes information identifying the second wireless communication device.

35. The method of claim 26, wherein the first frame comprises information identifying the third wireless device.

36. The method of claim 26, wherein the direct communication link is a link set up using a tunneled direct link setup (TDLS) protocol.

37. A wireless communication apparatus for communicating with two or more communication devices, comprising:
means for storing network information of a communication link between the apparatus and a first network communication device and direct link information of a direct link between the apparatus and a second wireless communication device;
means for computing operationally coupled to said storing means, said computing means configured to retrieve the direct link information from said storing means and determine that the direct link between the apparatus and the second wireless communication device is inoperative, said computing means further configured to generate a first frame indicating that the direct link is inoperative based on the determination that the direct link is inoperative; and
means for transmitting operationally coupled to said computing means, said transmitting means configured to broadcast the first frame for notifying at least the second wireless communication device that the direct communication link is inoperative.

38. The method of claim 37, wherein said storing means comprises a memory unit.

39. The method of claim 37, wherein said computing means comprises a processor.

40. The method of claim 37, wherein said transmitting means comprises a wireless transmitter.

41. A non-transitory, computer readable storage medium having instructions stored thereon that cause a processing circuit to:
determine a direct communication link between a first wireless communication device and at least a second wireless communication device is inoperative;
generate a first frame indicating that the direct communication link is inoperative based on the determination that the direct communication link is inoperative; and
broadcast the first frame to a third wireless device configured to communicate at least in part over a wireless network for notifying at least the second wireless communication device that the direct communication link is inoperative.

42. The computer readable storage medium of claim 41, wherein the third wireless device:
generates a second frame based on the first frame; and
sends the second frame for indicating that the direct communication link between the first wireless communication device and at least the second wireless communication device is inoperative.

43. The computer readable storage medium of claim 42, wherein:
the second frame is sent to the second wireless communication device for configuring the second wireless communication device to no longer use the direct communication link that had been established between the first wireless communication device and the second wireless communication device.

\* \* \* \* \*